United States Patent

[11] 3,622,557

[72] Inventors Andre Louis Sailer;
 Pierre Frank, both of Saint Clair du Rhone, France
[21] Appl. No. 729,368
[22] Filed May 15, 1968
[45] Patented Nov. 23, 1971
[73] Assignee Ugine Kuhlmann
 Paris, France
[32] Priority May 17, 1967
[33] France
[31] 106,642

[54] WATER-SOLUBLE PYRAZOLONE AZO DYESTUFFS DERIVED FROM PHTHALOCYANINE
3 Claims, No Drawings

[52] U.S. Cl. .................................................. 260/147,
 8/12.5, 8/13, 8/43, 260/163, 260/314.5
[51] Int. Cl. .................................................. C09b
 45/48, D06p 1/10
[50] Field of Search .......................................... 260/147

[56] References Cited
UNITED STATES PATENTS

| | | | |
|---|---|---|---|
| 3,133,050 | 5/1964 | Von Tobel.................. | 260/147 X |
| 3,445,449 | 5/1969 | Meininger et al............ | 260/147 |

*Primary Examiner*—Floyd D. Higel
*Attorney*—Beveridge & De Grandi

ABSTRACT: Dyestuffs of the formula:

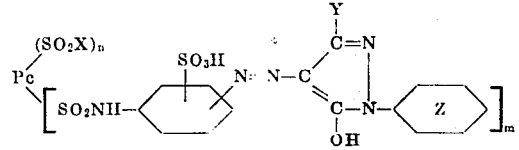

in which Pc represents the copper phthalocyanine residue, X represents an -OH or -NH-alkyl-OH group, Y represents a methyl or carboxyl group, the benezene ring Z may be substituted by at least one halogen atom or alkyl or sulpho group, $m$ represents an integer from 1 to 4, and $n$ represents an integer from 0 to 3, the sum $m+n$ being equal to 4, and the possible substitutents of the ring Z may be the same or different when $m$ is equal to or greater than 2. These dyestuffs are suitable for the dyeing of animal fibers, for example, leather in bright shades ranging from green to blue and the colorations are very uniform and remarkably fast to light, washing and solvents.

WATER-SOLUBLE PYRAZOLONE AZO DYESTUFFS DERIVED FROM PHTHALOCYANINE

The present invention relates to new dyestuffs of the general formula:

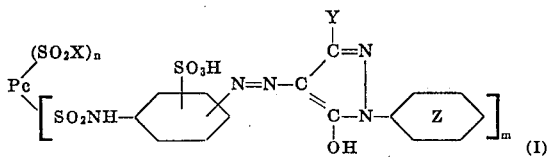

in which Pc represents a copper phthalocyanine residue, X represents an -OH or -NH-alkyl-OH group, the alkyl chain preferably containing one to seven carbon atoms, Y represents a methyl or carboxyl group, the benzene ring Z may be substituted by at lease one halogen atom or alkyl or sulfo group m represents an integer from 1 to 4, n represents an integer from 0 to 3, the sum of m+n being equal to 4, and the possible substituents of the ring Z being the same or different when m is equal to or greater than 2.

The dyestuffs of the general formula (I) may be prepared for example by diazotizing an amine of the formula:

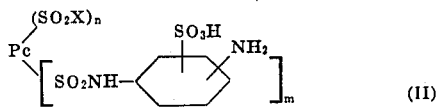

and coupling the diazo, tetrazo, hexazo or octazo derivative thus obtained with 1, 2, 3 or 4 moles of a pyrazolone or pyrazolones of the formula:

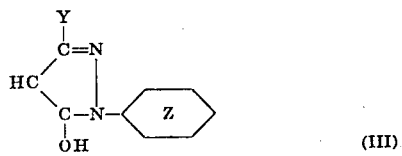

In formulas (II) and (III), the definitions of Pc, X, Y, m and n and the possible substituents of the ring Z are as defined above. The amines of formula (II) may be prepared for example by condensing copper phthalocyanine tetrasulfochloride with a diaminobenzenesulfonic acid, possibly in the presence of an amine of formula H₂N-alkyl-OH wherein the alkyl chain preferably contains one to seven carbon atoms. The sulfo chloride groups which may remain after the condensation are converted into sulfonic groups by alkaline hydrolysis.

The dyestuffs of general formula (I) may also be prepared for example by condensing copper phthalocyanine tetrasulfochloride with dyestuffs of the formula:

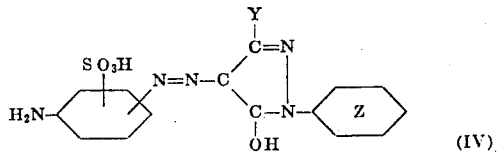

possibly in the presence of an amine of formula H₂N-alkyl-OH, the sulfochloride groups which remain being converted into sulfonic groups by alkaline hydrolysis. In formula (IV) the possible substituents of the ring Z are as defined above.

The dyestuffs of formula (IV) may be prepared for example by diazotizing an amino-acetylaminobenzene-sulfonic acid, coupling the diazo derivative with a pyrazolone of formula (III) and deacetylating.

The dyestuffs of general formula (I) dye animal fibers. They are especially suitable for dyeing leathers tanned by various methods. Bright shades ranging from green to blue are obtained. The colorations are very uniform and remarkably fast to light, washing and solvents. The aqueous solutions of the dyestuffs of the invention are very stable on keeping and insensitive to acids and bases.

The invention is illustrated by but not limited to the following examples in which the parts indicated are parts by weight unless the contrary is stated.

EXAMPLE 1

A. 128 parts of copper phthalocyanine are introduced in a period of 30 minutes into 600 parts of chlorosulfonic acid, the mixture is heated to 140° C. and maintained at this temperature for 2 hours. It is allowed to cool to 120° C., then 100 parts of thionyl chloride are added over a period of an hour, and the mixture is maintained for an hour at 120° C., and allowed to cool. The cold reaction mass is run on to 6,000 parts of water containing 2,800 parts of ice and 200 parts of sodium chloride. The copper phthalocyanine tetrasulfochloride thus obtained is filtered off and washed with 600 parts of a 3 percent solution of hydrochloric acid.

The precipitate is taken up in 1,000 parts of water, stirred for 10 minutes so as to obtain a homogeneous suspension, then a solution of 42.3 parts of 1,3-diamino-benzene-4sulfonic acid in 800 parts of water is added. The mixture is stirred for 4 hours, a 40 percent solution of sodium hydroxide is gently run in to bring the pH to 6.5 and 70 parts of sodium bicarbonate are added. STirring is then continued for 12 hours. The amine is precipitated by the addition of sodium chloride and acidification and has the formula:

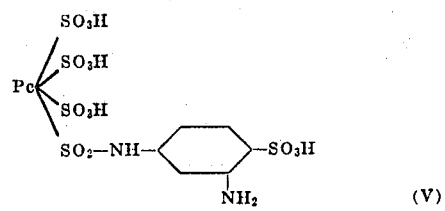

B. 106.6 parts of this amine are dissolved in 500 parts of water by means of a 40 percent solution of sodium hydroxide in an amount such that the pH of the solution is 7.5. 6.9 parts of sodium nitrite in aqueous solution are added to the above solution, then the mixture is run on to a mixture of 200 parts of water, 100 parts of ice and 30 parts of 20° B. hydrochloric acid. Diazotisation is effected over a period of an hour at 5° C., then the diazo derivative is slowly introduced into the solution obtained by dissolving, at pH 7, 34 parts of 2', 5'-dichloro-4'-sulfo-1phenyl-3-methyl-5-pyrazolone in 300 parts of water with 30 parts of sodium carbonate. When the coupling is completed, the dyestuff is precipitated by acidification and the addition of sodium chloride. The [4'-sulfo-2', 5'-dichloro-1-phenyl-3-methyl-5-hydroxy-pyrazole] - <4 azo 3'>- [4'-sulfo-phenylaminosulfonyl-copper trisulfophthalocyanie] is dried. It is in the form of a green powder which dissolves in water to give a green solution, and dyes leathers from various tannings in very bright yellowish-green shades. These have excellent fastness to light, washing, solvents, rubbing and velour finishing.

EXAMPLE 2

If in the process described in paragraph A of example 1, 42 parts of monoethanolamine are added after the addition of the solution of 1,3-diamino-benzene-4sulfonic acid, the amine with the formula given below is obtained after filtration:

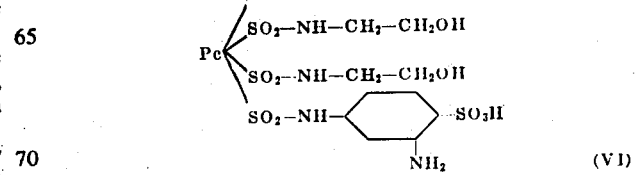

If in the process of paragraph B of example 1, the 106.6 parts of the amine of formula (V) are replaced by 119.5 parts of the amine of formula (VI), [4'-sulpho-2', 5'-dichloro-1-phenyl-3-methyl-5-hydroxy-pyrazole] - <4-azo 3'> - [4'-sulfo-phenylaminosulfonyl-tris-(β-hydroxy-ethylaminosulfonyl)-copper phthalocyanine] is obtained. After filtering off and drying, this dyestuff is in the form of a green powder which dissolves readily in water and dyes leathers from various tannings in green shades which are slightly more blue than those obtained with the dyestuff of example 1. These shades have a remarkable fastness to light, washing, solvents, rubbing and velour finishing.

Table I gives other examples of dyestuffs prepared in an analogous way to the above; the amines used are indicated by their formula.

TABLE I

| Example | Formula of amine used | Coupling compound | Shade on leather |
|---|---|---|---|
| 3 | Formula V | 4'-sulpho-1-phenyl-5-pyrazolone-3-carboxylic acid. | Very yellow green. |
| 4 | do | 4'-sulpho-1-phenyl-3-methyl-5-pyrazolone. | Green. |
| 5 | Formula VI | do | Bluish green. |

EXAMPLE 6

If in the process of paragraph A of example 1, the 42.3 parts of 1,3-diamino-benzene-4sulfonic acid are replaced by 84.6 parts of the same product than there is obtained, operating in a similar way, an amine of the formula:

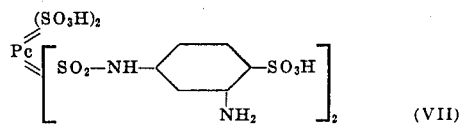

(VII)

If in the process of paragraph B of example 1, the amine of formula (V) is replaced by 61.8 parts of the diamine of formula (VIII), a dark green powder is obtained which readily dissolves in water. The formula of this dyestuff is as follows:

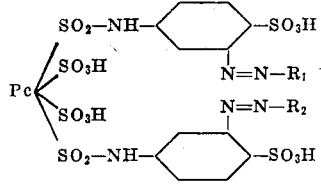

In this formula, R₁ and R₂ each represent a 2', 5'-dichloro-4'-sulfo-1-phenyl-3-methyl-5-hydroxy-4-pyrazolyl residue. This dyestuff dyes leathers from various tannings in green shades which are slightly yellower than the shades obtained with the dyestuff of example 1 and have analogous properties.

Table II gives further examples of dyestuffs of the above type which were prepared in a similar way from the diamine of formula (VII) using a mixture of two different coupling compounds (example 7) or a single coupling compound (example 8).

TABLE II

| Example | Coupling compound R₁ | R₂ | Shade on leather |
|---|---|---|---|
| 7 | 2',5'-dichloro-4'-sulpho-1-phenyl-3-methyl-5-pyrazolone. | 4'-sulpho-1-phenyl-3-methyl-5-pyrazolone. | Yellow-green. |
| 8 | 4'-sulpho-1-phenyl-3-methyl-5-pyrazolone. | do | Green. |

EXAMPLE 9

If the procedure in paragraph A of example 1 is carried out, but with 84.6 parts of 1,3-diamino-benzeneH-4-sulfonic acid and 28 parts of monoethanolamine, the diamine of the following formula is obtained;

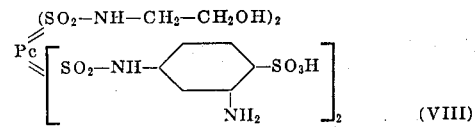

(VIII)

If in the process described in paragraph B of example 1 the amine of formula (V) is replaced by 66.1 parts of the amine of formula (VIII), a dark green powder is obtained which is bis-(β-hydroxyethylaminosulfonyl)-bis-(2'',5''-dichloro-4''-sulfo-1'-phenyl-3'-methyl-5'-hydroxy-4'-pyrazolyl-3-azo-4-sulfo-phenylaminosulfonyl)-copper phthalocyanine. This dyestuff gives green shades on leathers from various tannings, which are slightly more blue than those obtained with the dyestuff of example 6 and are of improved fastness.

EXAMPLE 10

On proceeding according to paragraph B of example 1, but replacing the amine of formula (V) by the diamine of formula (VIII) and coupling with 4'-sulfo-1-phenyl-3-methyl-5-pyrazolone, a dyestuff is obtained which dyes leathers from various tannings in green shades.

EXAMPLE 11

On proceeding as in paragraph A of example 1, but using 126.9 parts of 1,3-diamino-benzene-4-sulfonic acid, the triamine of the following formula is obtained:

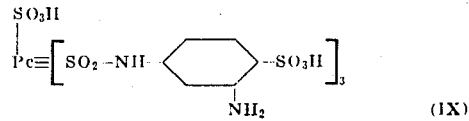

(IX)

140.6 parts of the triamine of formula (IX) are diazotized in the presence of 20.7 parts of sodium nitrite and the hexazo derivative is coupled with 76.2 parts of 4'-sulfo-1phenyl-3-methyl-5-pyrazolone. The trisazo dyestuff obtained, namely the tris-(4''-sulfo-1'-phenyl-3'-methyl-5'hydroxy-4'pyrazolyl-3-azo-4-sulfophenylaminosulfonyl)-copper sulfophthalocyanine, is in the form of a dark green powder which dyes leathers from various tannings in green shades having remarkable fastness to light, washing, solvents, rubbing and velour finishing.

EXAMPLE 12

On operating as in paragraph A of example 1, but using 169.2 parts of 1,3-diamino -benzene-4-sulfonic acid, the tetramine of the formula

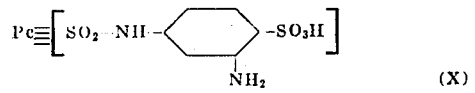

(X)

is obtained.

On diazotizing this tetramine and coupling the octazo derivative with 2', 5'-dichloro-4'-sulpho-1-phenyl-3-methyl-5-pyrazolone, a dyestuff is obtained which dyes leathers from various tannings in yellow-green shades.

EXAMPLE 13

The phthalocyanine tetrasulfochloride prepared as indicated in example 1 from 128 parts of copper phthalocyanine is taken up in 1,000 parts of water. A solution at pH 7 of 100 parts of [3-amino-6-sulpho-benzene] - <1 azo 4 > - [4'-sulpho-1-phenyl-3-methyl-5-hydroxy-pyrazole] in 500 parts of water is introduced into the above suspension. The mixture is stirred for 3 hours, a solution of sodium hydroxide is added to bring the pH to 6.5–7, then 70 parts of sodium bicarbonate are added. The mixture is stirred for a further 12 hours, then the green dyestuff obtained is separated by acidification and the addition of sodium chloride. This dyestuff is identical with the dyestuff of example 4.

EXAMPLE 14

If besides the 100 parts of monoazo dyestuff, 28 parts of monoethanolamine are added in the preceding example, the same dyestuff as in example 5 is obtained.

EXAMPLE 15

If the 100 parts of azo-pyrazole in example 13 are replaced by 107 parts of [3-mino-6-sulpho-benzene] - <1 azo 4> [4'-sulpho-1-phenyl-3-carboxy-5-hydroxy-pyrazole], the same dyestuff as in example 3 is obtained.

We claim:

1. A dyestuff of the formula:

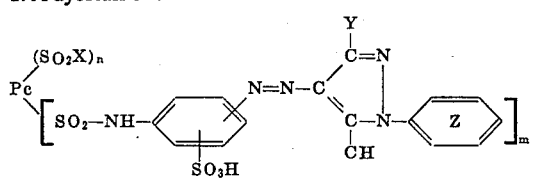

in which Pc represents copper phthalocyanine, X represents —OH or NH—$CH_2CH_2OH$, Y represents methyl or carboxy, the benzene ring Z is unsubstituted or substituted by a member selected from the group consisting of chlorine atoms, sulfo groups and mixtures thereof, $m$ represent an integer from 1 to 4, $n$ represents an integer from 0 to 3, the sum $m+n$ being equal to 4, and, when $m$ is equal to or greater than 2, the residues

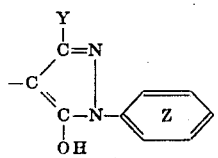

are the same or different.

2. The dyestuff which in the state of free acid has the formula:

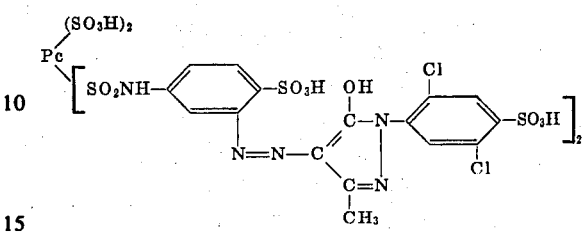

wherein Pc represents copper phthalocyanime.

3. The dyestuff which in the state of free acid has the formula:

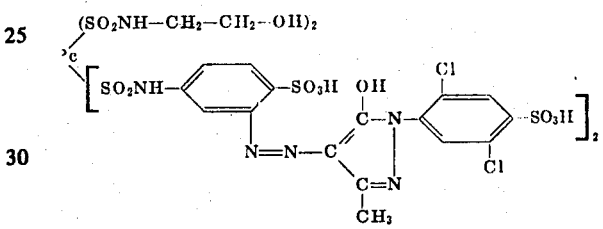

wherein Pc represents copper phthalocyanine.

* * * * *